United States Patent [19]
Muntjanoff

[11] 3,895,694
[45] July 22, 1975

[54] GRAPPLE SNUBBING APPARATUS
[75] Inventor: John R. Muntjanoff, Aurora, Ill.
[73] Assignee: Caterpillar Tractor Co., Peoria, Ill.
[22] Filed: July 11, 1974
[21] Appl. No.: 487,726

[52] U.S. Cl. .................................. 188/83; 188/1 B
[51] Int. Cl. ...................... F16d 63/00; F16f 13/02
[58] Field of Search .............. 188/1 B, 83, 130, 166; 294/86 R

[56] References Cited
UNITED STATES PATENTS

| | | | |
|---|---|---|---|
| 1,822,824 | 9/1931 | Roumens | 188/130 |
| 2,445,607 | 7/1948 | De Ghetto | 188/83 X |
| 2,999,268 | 9/1961 | Strandengen | 188/83 X |
| 3,592,503 | 7/1971 | Lundberg | 294/86 R |

OTHER PUBLICATIONS
Mukai, S., Torsion Bar Dampening Device, IBM Technical Disclosure Bulletin, p. 13, Vol. 3, No. 10, March 1961.

Primary Examiner—Duane A. Reger
Attorney, Agent, or Firm—Phillips, Moore, Weissenberger Lempio & Strabala

[57] ABSTRACT

An apparatus to control oscillation of a grapple device on a transporting vehicle includes a pin disposed through the bore of a housing, and a retaining member associated with the pin and secured from rotation relative to one of the pin and housing. The one of the pin and housing member which is not secured from rotation relative to the retaining member, and the retaining member, together define a cooperating seatable protrusion and recess, of arcuate cross-section. Resilient means are included to urge the retaining member so as to seat the protrusion in the recess. Also included are means for limiting longitudinal movement of the pin under this urging. However, the force of such resilient means may be overcome by rotation of the grapple device relative to a yoke associated therewith about a longitudinal axis of the pin to unseat the protrusion from the recess.

14 Claims, 7 Drawing Figures

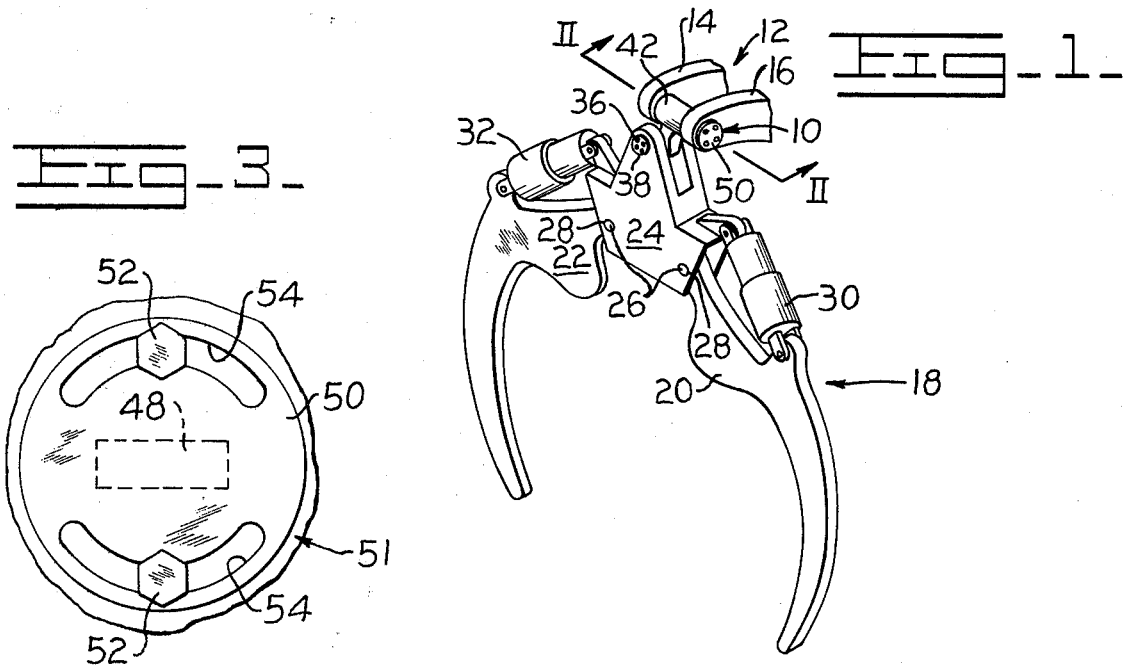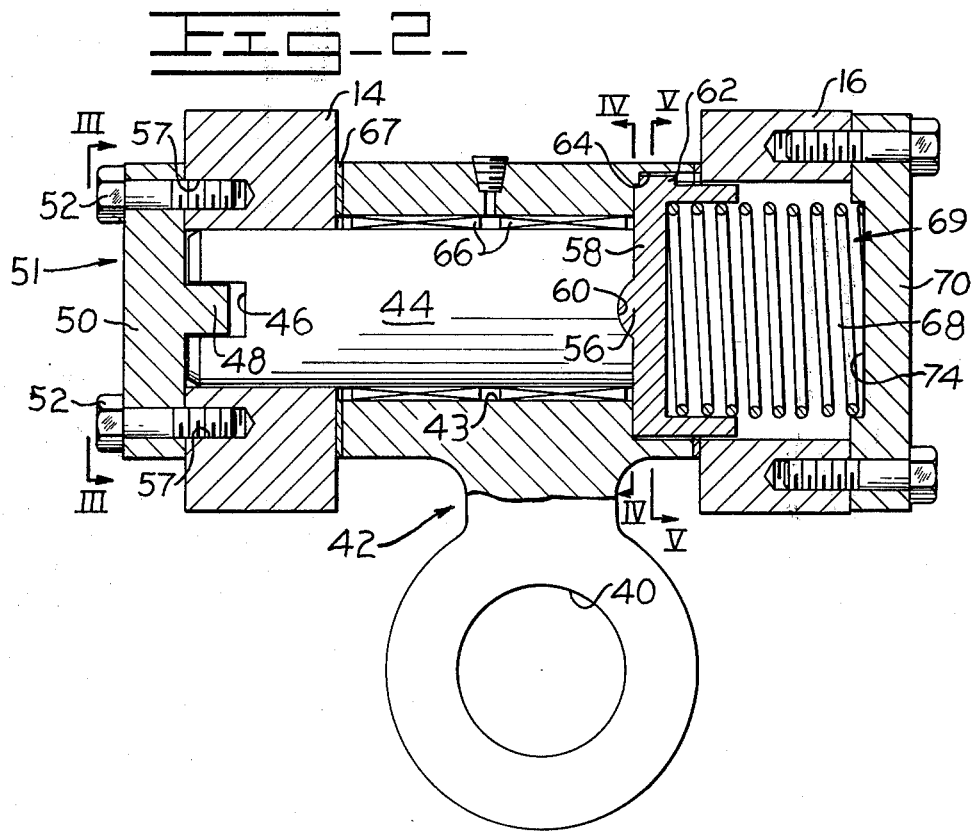

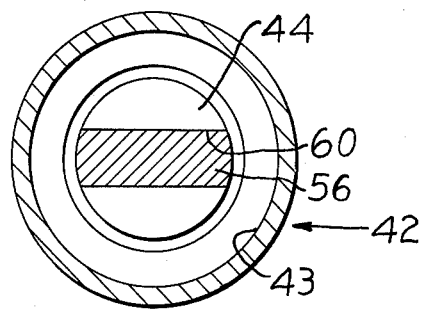
Fig-4-
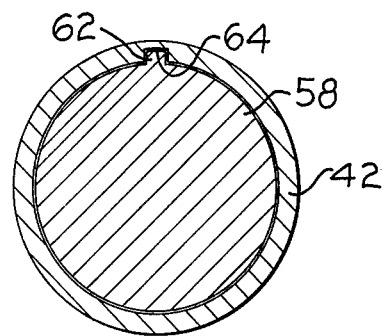
Fig-5-
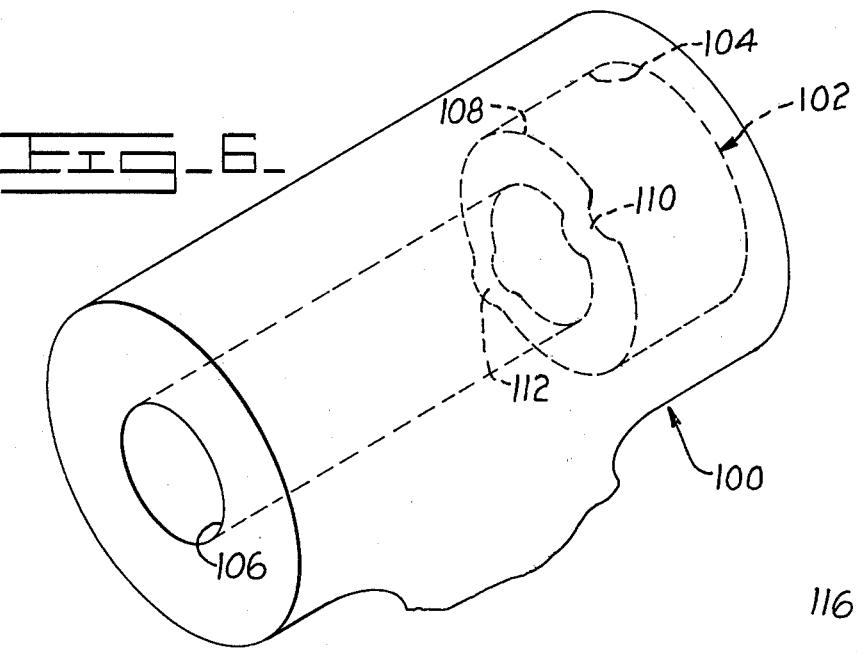
Fig-6-
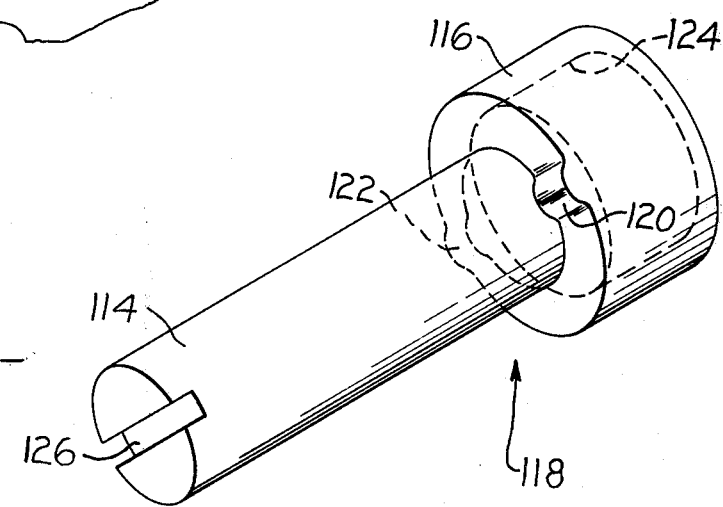
Fig-7-

GRAPPLE SNUBBING APPARATUS

BACKGROUND OF THE INVENTION

This invention relates to certain well-known skidder machines utilizing any one of well-known grapple mechanisms to gather and transport logs or bolts from the working site to other locations, and more particularly to a bias tension-actuated grapple snubbing apparatus wherein a cam means is rotatably disposable to determine the chosen gradation of bias tension urged on the pin and is primarily engaged during the unloaded operation of the skidder machine when proceeding at roadway speeds.

Conventionally, grapple mechanisms are allowed to oscillate freely at the end of the support arch of a skidder or like machine which results in damage to the members of the grapple mechanism. (See U.S. Pat. Nos. 3,582,127 to Johnson and 3,594,034 to Rowell.) Conventionally, certain other grapple mechanisms are protected by hydraulic vane-actuated damping means which have the undesirable side-effect of complicated manufacture and are not readily adjustable for various applications of damping torque. (See U.S. Pat. No. 3,592,503 to Lundberg.)

Other attempts to control such undesirable oscillation utilize cables, locking caps, chockers and other devices of limited efficacy and complicated application. (See generally: U.S. Pat. No. 3,513,998 to Stone.)

SUMMARY AND OBJECTS OF THE INVENTION

The object of this invention, therefore, is to provide an effective, readily engageable and disengageable grapple snubbing apparatus with means to determine the chosen gradation of bias tension transmitted to the apparatus without the need to engage and disengage various caps, chockers or cables to secure the grapple mechanism from undesirable oscillation.

Broadly stated, the invention disclosed herein comprises apparatus for controlling oscillation of a first member relative to a yoke member defining first and second arm means. Such apparatus comprises a pin, and means for securing the pin from rotation about the longitudinal axis thereof relative to the first and second arm means. A housing member is secured relative to the first member and is positioned between the first and second arm means and defines a bore through which the pin is disposed. A retaining member is disposed adjacent a first end of the pin and is secured from rotation relative to one of the pin and housing member. Resilient means are associated with the second arm means and retaining member for urging the retaining member away from the second arm means. Means are included for limiting movement of the pin under the urging of the retaining member by the resilient means. The one of the pin and housing member which is not secured from rotation relative to the retaining member, and the retaining member, together defining cooperating seatable protrusion and recess means. Such protrusion and recess means are positioned so that rotation of the first member relative to the yoke member about the longitudinal axis of the pin causes unseating of the protrusion and recess means, against the resilience of the resilient means, from a seated position.

BRIEF DESCRIPTION OF THE DRAWINGS

Other objects of this invention will become apparent from the following description and accompanying drawings, wherein:

FIG. 1 illustrates the preferred embodiment of the invention;

FIG. 2 is a longitudinal cross-sectional view of the grapple snubbing apparatus of FIG. 1 taken along the line II—II thereof;

FIG. 3 is a view taken along line III—III of FIG. 2;

FIG. 4 is a sectional view taken along line IV—IV of FIG. 2;

FIG. 5 is a sectional view taken along line IV—IV of FIG. 2;

FIG. 6 is a perspective view of another embodiment of housing member; and

FIG. 7 is a perspective view of another embodiment of pin and retaining member.

DETAILED DESCRIPTION

With reference to the drawings, a grapple snubbing apparatus is shown at 10 and controls relative oscillation between a yoke member 12 defined by first and second grapple arch arm means 14 and 16, respectively, only partly shown in FIG. 1, and a grapple mechanism 18 comprising generally first and second arcuate prehensile grapple arms 20 and 22, respectively, and shown in FIG. 1 only. The grapple arms 20 and 22 are operatively connected to a connecting member 24 by pins 26 disposed through bore 28 in the connecting member 24 and further disposed through positionally aligned bores in the grapple arms 20 and 22 so that the grapple arms 20 and 22, can be selectively positioned to pick up or release logs, bolts or the like, as desired. The grapple arms 20 and 22 are operatively actuated by first and second jack members 30 and 32, respectively, movably connected to the connecting member 24 and the grapple arms 20 and 22; one of said jacks being disposed on either side of the grapple mechanism 10 on a longitudinal axis thereof. The grapple mechanism 18 is detachably connected to the grapple snubbing apparatus 10 by a pin 36 (shown in FIG. 1 only) disposed through a bore 38 in the connecting member 24 and further through an axially aligned bore 40 (shown in FIG. 2) in apparatus housing member 42.

The grapple snubbing apparatus 10 comprises a pin 44 disposed through an annular bore 43 defined by housing member 42 on its longitudinal axis, the housing member being positioned between arms 14 and 16. The pin 44 is secured from rotation about its longitudinal axis relative to arms 14 and 16 by positional adjusting means 51. The adjusting means 51 includes an end member 50 defining a rib portion 48 in complementary seating engagement with a channel 46 defined by an end of the pin 44. End member 50 is secured from rotation relative to the arms 14 and 16 by bolts 52 disposed through arcuate apertures 54 formed end and member 50, and threadably engaged with internally threaded bores 57 in the arm 14. The positional adjusting means 51 provides means to positionally selectively dispose pin 44 about its longitudinal rotational axis relative to the arms 14 and 16 in a chosen pivotal attitude. Such disposition of the pin 44 is accomplished by loosening bolts 52 and pivotally moving end member 50 about the longitudinal rotational axis of the pin 44 relative to the arms 14 and 16.

With the pin 44 so pivotally disposed by the positional adjusting means 51, retaining member 58 is secured from rotation relative to the housing member 42 by a spline 62 on the retaining member seatably engaged with a complementary slot 64 in the housing member 42.

Rotation of the housing 42 relative to the arms 14, 16 causes the unseating of a protrusion 56 desired by retaining member 58 from a sealably cooperative recess 60 in one end of the pin 44, and against the longitudinal urging of a resilient means 68 disposed between retaining member 58 and an end cap 70 fixed to arm 16, from its normal seated position in the recess 60. Both the protrusion 56 and the recess 60 are arcuate in cross-section. The resilient means is a helical spring 68 compressively retained in a chamber 69 having sides defined by the end cap 70, and retaining member 58, and urges the retaining member 58 away from the arm 16 and toward the end of the pin defining recess 60. The pin 44 is limited in movement in such direction under the urging of the resilient means by contacting the end member 50. End cap 70 has a stepped seat 74 therein to seatably accept the spring 68 for stability.

The pivotal movement of the housing 42 is made easier by two annular bushings 66 circumposed about the pin 44 and contacting the bore 43 of the housing member 42. A thrust washer 67 disposed between the housing member 42 and the arm 14 provides an improved bearing surface between them so as to reduce wear of these apparatus members as a result of oscillation of the grapple mechanism 18 relative to the yoke 12.

Referring now to FIGS. 6 and 7, a housing member 100 defines a stepped annular bore 102 defining a first portion 104 and a second portion 106. The stepped portion 108 interconnecting the bores 102, 104 defines recesses 110, 112 of arcuate cross-section.

A pin 114 and a retaining member 116 together define a single unitary member 118, so that the retaining member 116 is secured from rotation relative to the pin 114. The retaining member 116 defines protrusions 120, 122 which are arcuate in cross-section. In such embodiment, the housing member 100 replaces the housing member 42, and the member 118, with pin 114 disposed in bore 106, and retaining member 116 disposed in bore 104 replaces pin 44 and retaining member 58. Spring 68 extends to within a chamber 124 defined within retaining member 116 and channel 126 defined by an end of pin 114 receives rib portion 48. It will be seen that the protrusions 120, 122 and recesses 110, 112 cooperate in a manner similar to the recess 60 and protrusion 56 of the previous embodiment.

Positional adjustment of this additional embodiment of the invention is accomplished in like manner to the first embodiment thereof, as discussed above.

An improved design grapple snubbing apparatus configured as above virtually eliminates the need for complicated and expensive devices requiring many components which are difficult to manipulate and also eliminates the need for various fluids which must be exchanged for each other to determine various gradation of damping bias within the apparatus, and provides a simple and self-contained apparatus to control undesirable oscillation in grapple devices and like mechanisms.

What is claimed is:

1. Apparatus for controlling oscillation of a first member relative to a yoke member defining first and second arm means, comprising:
   a pin;
   means for securing the pin from rotation about the longitudinal axis thereof relative to said first and second arm means;
   a housing member secured relative to said first member and positioned between said first and second arm means and defining a bore through which said pin is disposed;
   a retaining member disposed adjacent a first end of the pin and secured from rotation relative to one of the pin and housing member;
   resilient means associated with the second arm means and retaining member for urging the retaining member away from the second arm means;
   means for limiting movement of the pin under urging of the retaining member by the resilient means;
   the one of the pin and housing member which is not secured from rotation relative to the retaining member, and the retaining member, together defining cooperating seatable protrusion and recess means, positioned so that rotation of the first member relative to the yoke member about the longitudinal axis of the pin causes unseating of the protrusion and recess means, against the resilience of the resilient means, from a seated position.

2. The invention of claim 1 wherein the means for securing said pin from rotation comprises an end member securable relative to the first and second arms, one of said end member and the second end of the pin defining a rib portion is complementary engagement with a channel defined by the other of the end member and second end of the pin.

3. The invention of claim 2 wherein second end of the pin defines the channel therein, and said end member defines the rib thereon.

4. The invention of claim 3 and means for allowing adjustment of the end member and pin about the longitudinal axis of the pin to allow securing of the pin relative to the first and second arm means in a chosen pivotal attitude.

5. The invention of claim 1 wherein the retaining member is secured from rotation relative to the housing.

6. The invention of claim 5 wherein the first end defines said recess, and said retaining member defines said protrusion.

7. The invention of claim 5 wherein the protrusion and recess are arcuate in cross-section.

8. The invention of claim 7 wherein the resilient means associated with said second arm means and said retaining member comprises a helical spring.

9. The invention of claim 1 wherein the protrusion and recess are arcuate in cross-section.

10. The invention of claim 1 wherein the retaining member is secured from rotation relative to the pin.

11. The invention of claim 10 wherein the retaining member defines said protrusion, and said housing defines said recess.

12. The invention of claim 11 wherein the protrusion and recess are arcuate in cross-section.

13. The invention of claim 12 wherein said pin and retaining member define a single unitary member.

14. The invention of claim 13 wherein the resilient means associated with said second arm means and retaining member comprise a helical spring.

* * * * *